United States Patent
Ye et al.

(10) Patent No.: US 9,509,168 B2
(45) Date of Patent: Nov. 29, 2016

(54) WIRELESS POWER TRANSMITTERS WITH WIDE INPUT VOLTAGE RANGE AND METHODS OF THEIR OPERATION

(71) Applicant: Freescale Semiconductor, Inc., Austin, TX (US)

(72) Inventors: Wanfu Ye, Shanghai (CN); Xiang Gao, Shanghai (CN); Chongli Wu, Queen Creek, AZ (US)

(73) Assignee: FREESCALE SEMICONDUCTOR, INC., Austin, TX (US)

(\*) Notice: Subject to any disclaimer, the term of this patent is extended or adjusted under 35 U.S.C. 154(b) by 232 days.

(21) Appl. No.: 14/082,774

(22) Filed: Nov. 18, 2013

(65) Prior Publication Data

US 2015/0061577 A1 Mar. 5, 2015

(30) Foreign Application Priority Data

Sep. 4, 2013 (CN) .......................... 2013 1 0526862

(51) Int. Cl.
*H02J 7/00* (2006.01)
*H02J 7/02* (2016.01)

(52) U.S. Cl.
CPC ...................................... *H02J 7/025* (2013.01)

(58) Field of Classification Search
USPC .................................................. 320/108, 162
See application file for complete search history.

(56) References Cited

U.S. PATENT DOCUMENTS

| | | | |
|---|---|---|---|
| 6,160,388 A * | 12/2000 | Skelton | ............... H02M 3/1588 323/282 |
| 7,212,414 B2 | 5/2007 | Baarman | |
| 7,639,514 B2 | 12/2009 | Baarman | |
| 7,855,529 B2 | 12/2010 | Liu | |
| 7,953,369 B2 | 5/2011 | Baarman | |
| 8,116,683 B2 | 2/2012 | Baarman | |
| 8,129,864 B2 | 3/2012 | Baarman et al. | |
| 8,188,619 B2 | 5/2012 | Azancot et al. | |
| 8,290,463 B2 | 10/2012 | Liu et al. | |
| 8,294,418 B2 | 10/2012 | Hui et al. | |
| 8,300,440 B2 | 10/2012 | Ho et al. | |
| 8,301,077 B2 | 10/2012 | Xue et al. | |
| 2002/0008981 A1* | 1/2002 | Jain | ..................... H02M 7/5387 363/132 |
| 2010/0046259 A1 | 2/2010 | Ho et al. | |

(Continued)

FOREIGN PATENT DOCUMENTS

| | | |
|---|---|---|
| EP | 2146414 A1 | 1/2010 |
| EP | 2302756 A1 | 3/2011 |

(Continued)

*Primary Examiner* — Brian Ngo

(57) ABSTRACT

The embodiments described herein provide a power transmitter for wireless charging of an electronic device and methods of its operation. The power transmitter uses an inverter configured to generate a square wave from a potentially wide ranging DC input voltage. The inverter is configured to generate the square wave with a duty cycle that results in a desired equivalent voltage output, effectively independent of the DC input voltage that is provided. Thus, by generating a square wave with a selectable duty cycle the inverter provides the ability to facilitate wireless power transfer with a wide range of DC input voltages. Furthermore, in some embodiments the power transmitter may provide improved power transfer efficiency using a quasi-resonant phase shift control strategy with adjustable dead time and a matching network that is dynamically selectable to more effectively couple with the transmitter coil combination being used to transmit power to the electronic device.

20 Claims, 6 Drawing Sheets

(56) References Cited

U.S. PATENT DOCUMENTS

| | | |
|---|---|---|
| 2010/0046264 A1 | 2/2010 | Ho et al. |
| 2010/0171461 A1 | 7/2010 | Baarman et al. |
| 2011/0025132 A1* | 2/2011 | Sato ................ H02J 5/005 307/104 |
| 2011/0070830 A1 | 3/2011 | Xue et al. |
| 2011/0084655 A1 | 4/2011 | Hui et al. |
| 2011/0134673 A1 | 6/2011 | Ho et al. |
| 2011/0169337 A1* | 7/2011 | Kozakai ............ H02J 5/005 307/104 |
| 2011/0187318 A1 | 8/2011 | Hui et al. |
| 2011/0199045 A1 | 8/2011 | Hui et al. |
| 2012/0039092 A1* | 2/2012 | Xu ................ H02M 3/3376 363/17 |
| 2012/0212150 A1* | 8/2012 | Lakirovich ........ H05B 33/086 315/250 |
| 2012/0319479 A1* | 12/2012 | Covic ............... H02J 5/005 307/31 |
| 2013/0017798 A1 | 1/2013 | Liu et al. |
| 2013/0039099 A1* | 2/2013 | Wu ................ H02M 7/53871 363/40 |
| 2013/0099734 A1* | 4/2013 | Lee .................. H02J 7/007 320/108 |
| 2013/0119773 A1* | 5/2013 | Davis ................ H02J 5/005 307/104 |
| 2013/0154384 A1* | 6/2013 | Nakamura ........ H01F 38/14 307/104 |
| 2013/0187598 A1* | 7/2013 | Park ................ H02J 7/0042 320/108 |
| 2015/0208492 A1* | 7/2015 | Zhu ................ H05B 41/2985 315/247 |

FOREIGN PATENT DOCUMENTS

| | | |
|---|---|---|
| WO | 2010020181 A1 | 2/2010 |
| WO | 2010020182 A1 | 2/2010 |
| WO | 2011036545 A1 | 3/2011 |
| WO | 2011036546 A1 | 3/2011 |
| WO | 2011042778 A1 | 4/2011 |
| WO | 2011067635 A1 | 6/2011 |
| WO | 2013013564 A1 | 1/2013 |

* cited by examiner

WIRELESS POWER TRANSMITTERS WITH WIDE INPUT VOLTAGE RANGE AND METHODS OF THEIR OPERATION

CROSS-REFERENCE TO RELATED APPLICATION

This application claims priority under 35 U.S.C. §119 to China Patent Application No. 201310526862.3, filed Sep. 4, 2013, which is incorporated herein in its entirety.

TECHNICAL FIELD

Embodiments of the subject matter described herein relate generally to electronic devices, and more particularly to wireless power charging for electronic devices.

BACKGROUND

Many modern electronic devices are mobile devices that use batteries and/or capacitors as power supplies. In many such devices there is a need to frequently recharge the power supplies. To facilitate ease of recharging such devices wireless recharging is increasingly being employed. However, there remain significant limitations in many wireless charging systems. For example, many wireless charging systems lack the flexibility to work with multiple types of power sources. For example, such wireless power systems may be unable to function with power sources having significantly varying input voltage.

Furthermore, many such wireless charging systems continue to suffer from excessively inefficient power transfer. In such systems the amount of power consumed to facilitate charging of the mobile device will be excessive, and furthermore may not meet present and future regulatory requirements.

These and other limitations continue to impede the wider adoption of wireless power charging of mobile devices. Thus, there is a continuing need for improved wireless power transfer devices and techniques.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or the following detailed description.

The embodiments described herein can provide wireless power charging with improved flexibility. For example, the embodiments described herein can provide wireless power charging that operates with a relatively wide range of input voltages. As other examples, the embodiments described herein can provide improved wireless power transfer efficiency.

In one embodiment a power transmitter for wireless charging of an electronic device is provided. In general, the power transmitter uses an inverter configured to generate an alternating current (AC) square wave from a potentially wide ranging direct current (DC) input voltage. In one embodiment the inverter is configured to generate the AC square wave with a duty cycle that results in a desired equivalent voltage output, effectively independent of the DC input voltage that is provided. For example, generating the AC square wave by utilizing a phase shifting technique which the control signals between a first complementary pair half bridge and a second complementary pair half bridge of an H-bridge inverter. Thus, by generating an AC square wave with a selectable duty cycle the inverter provides the ability to facilitate wireless power transfer within a wide range of DC input voltages, and thus may provide improved flexibility for wireless power transfer to electronic devices.

Furthermore, in some embodiments the power transmitter may provide improved power transfer efficiency using a matching network that is dynamically selectable to more effectively couple with the transmitter coil combination being used to transmit power to the electronic device. Furthermore, in some embodiments the fundamental frequency of the power transfer signal is controllable to provide potentially improved power transfer efficiency.

Figure 1:
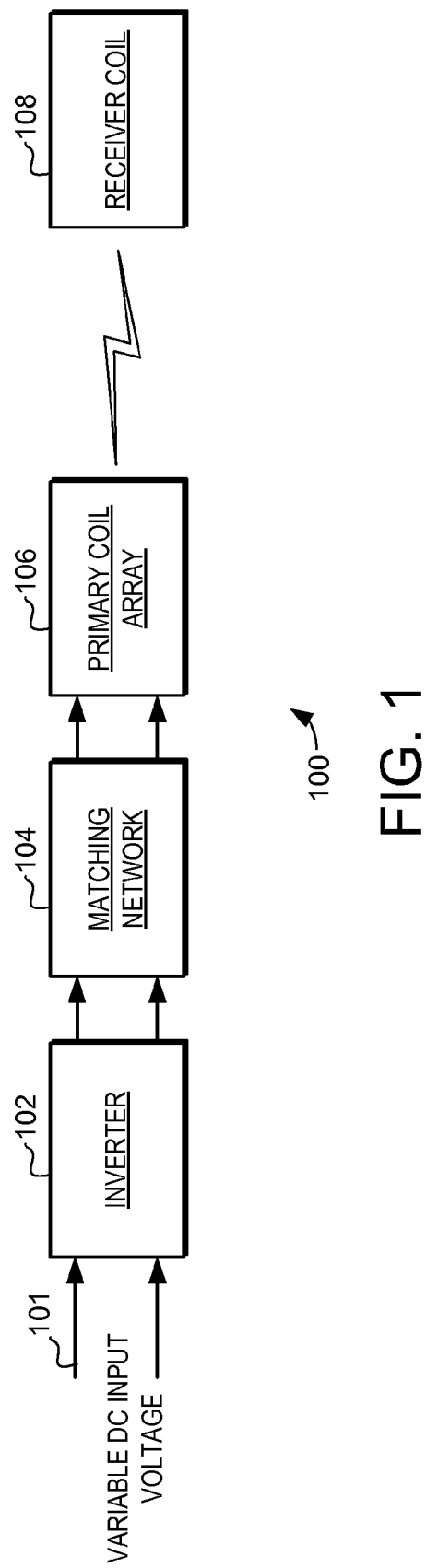
FIG. 1 is a simplified system block diagram of a power transmitter in accordance with an example embodiment.

Turning now to FIG. 1, a power transmitter 100 for wireless charging of an electronic device is illustrated schematically. The power transmitter 100 includes an input 101, an inverter 102, a matching network 104 and a primary coil array 106. The input 101 is configured to receive a variable DC input voltage, and using the variable DC input voltage the power transmitter 100 is configured to wirelessly transmit power to a receiver coil 108 of a nearby electronic device. In general, the inverter 102 is configured to receive a potentially wide range variable DC input voltage and generate an AC square-wave signal having a duty cycle selected to provide a predetermined equivalent voltage appropriate for power transfer. The AC square-wave signal is provided to the matching network 104. The matching network 104 is configured to generate a charging signal from the AC square-wave signal and provide the charging signal to the primary coil array 106. The primary coil array 106 includes a plurality of selectable primary coils. These primary coils are individually selectable such that selected coil combinations of one or more primary coils can be used to transmit a power transfer signal to a receiver coil 108 of the electronic device.

During operation the inverter 102 generates the AC square-wave signal with a duty cycle that results in a desired equivalent voltage output independent of the DC input voltage. Thus, by generating an AC square-wave signal with a selectable duty cycle the inverter 102 may facilitate operation within a relatively wide range of possible DC input voltages. For example, the inverter 102 can be configured to provide the desired equivalent voltage output with a DC input voltage that can vary between about 5 and about 20 volts. In other embodiments the DC input voltage can vary between about 5 and about 15 volts. Such an embodiment would provide improved flexibility for wireless power transfer using a variety of different power sources. For example, such an embodiment can provide the flexibility to use both Universal Serial Bus (USB) based power sources that are at approximately 5 volts, and automotive power sources that are commonly between 9 and 14 volts. In still other embodiments, the DC input voltage may vary across a voltage range having a higher lower boundary and/or a higher upper boundary.

In one embodiment the desired equivalent voltage generated by the inverter 102 is based on information from the electronic device. For example, the electronic device can specify the voltage of the power signal transmitted to the receiver coil 108 of the electronic device. As will be described in greater detail below in some embodiments the electronic device can specify such information by transmitting a signal from the receiver coil 108 of the device to the primary coil array 106 of the power transmitter 100.

In one embodiment the inverter 102 comprises a single stage inverter. A single stage inverter can provide efficient power transfer by minimizing power loss. In one specific embodiment the inverter 102 utilizes power metal-oxide-semiconductor field-effect transistors (MOSFETS), but other types of transistors could also be used. In such an embodiment the inverter 102 can be configured to adjust dead time of the power MOSFETS based on the magnitude of the DC input voltage and loading to facilitate low switching loss.

In one specific embodiment the inverter 102 uses a shifted phase topology to generate the AC square-wave signal with the duty cycle selected. Such an embodiment will be discussed below with reference to FIG. 5. For example, the inverter 102 can utilize a phase-shifted H-bridge topology.

In one embodiment the inverter 102 is configured to generate the AC square-wave signal at a plurality of different frequencies. In such an embodiment the power transmitter 100 is further configured to determine which of the plurality of different frequencies results in efficient power transfer to the electronic device based on feedback received from the electronic device.

As described above the matching network 104 is configured to generate a charging signal from the AC square-wave signal and provide the charging signal to the primary coil array 106. In a typical embodiment the matching network 104 is implemented such that the generated charging signal is a sinusoidal-type signal having a fundamental frequency of AC square-wave signal. Furthermore in some embodiments the matching network 104 provides improved power transfer efficiency by using selective switching to provide more effective coupling with the primary coil combination used in the primary coil array 106. In one embodiment this is accomplished by including a plurality of switched capacitors and an inductor in the matching network 104. Each of the plurality of switched capacitors can be selectively switched based upon which of the plurality of selectable primary coils are selected. In one embodiment each of these switched capacitors is configured to make the resonant frequency of the power transmitter near the fundamental frequency of the charging signal when the corresponding primary coil combination is active.

As described above, the primary coil array 106 includes a plurality of selectable primary coils, in an embodiment. These primary coils can be implemented with any combination of wire-wound coils, printed circuit board (PCB) coils, or hybrid/wire-wound coils. These primary coils are individually selectable such that a coil combination of one or more primary coils in the array 106 can be selected and used to transmit a power transfer signal to a receiver coil 108. In one specific embodiment each of the plurality of selectable primary coils are selectively activated to utilize a coil combination that is most effective to couple with the receiver coil 108 of the electronic device. As will be described in greater detail below, the most effective coil combination can be selected based on a feedback signal received from the electronic device, where the feedback signal provides an indication of power transfer efficiency. In an alternate embodiment, the primary coil array 106 may include only a single coil, rather than multiple coils.

The power transmitter 100 can be implemented with a variety of other elements. For example, the power transmitter 100 can be further implemented with an input voltage detector configured to determine a magnitude of the DC input voltage. In such an embodiment the inverter 102 can be configured to select the output duty cycle by using phase shift technique to provide the predetermined equivalent voltage based on the magnitude determined by the input voltage detector.

As another example, the power transmitter 100 can be further implemented with a sensing circuit coupled to the plurality of selectable primary coils in the primary coil array 106. In such an embodiment the sensing circuit can be configured to sense signals received on at least one of the plurality of selectable primary coils to facilitate communication transmitted from the electronic device back to the primary coils. The communication messages include, but are not limited to, the information of power transfer efficiency and energy requested by the electronic device.

Finally, in some embodiments the power transmitter 100 can further include a microcontroller. In such an embodiment the microcontroller can be configured to control operation of the inverter 102, the matching network 104 and/or the plurality of selectable primary coils 106. Furthermore the microcontroller can be used to control other elements, such the input voltage detector and sensing circuit described above.

In one specific embodiment the microcontroller is coupled to an input voltage detector, a sensing circuit, the inverter 102, the matching network 104, and the coil array 106 and may be configured to control the inverter 102 to generate the AC square-wave signal with a duty cycle selected based on the determined magnitude of the DC input voltage such that the AC square-wave signal provides a predetermined equivalent voltage. Furthermore, the microcontroller may be configured to control the plurality of selectable coils in the coil array 106 to selectively activate a coil combination effective to couple with the receiver coil 108 on the electronic device. Furthermore, the microcontroller may be configured to selectively couple the plurality of switched capacitors in the matching network 104 based on the activated coil combination. The microcontroller also may be configured to receive communication from the receiver coil 108 on the electronic device based on a signal received on at least one of the plurality of selectable primary coils.

Finally, the microcontroller may be configured to control the power transferred from transmitter to the receiver coil 108 of the electronic device based on the communication message (s) received by microcontroller.

Figure 2:
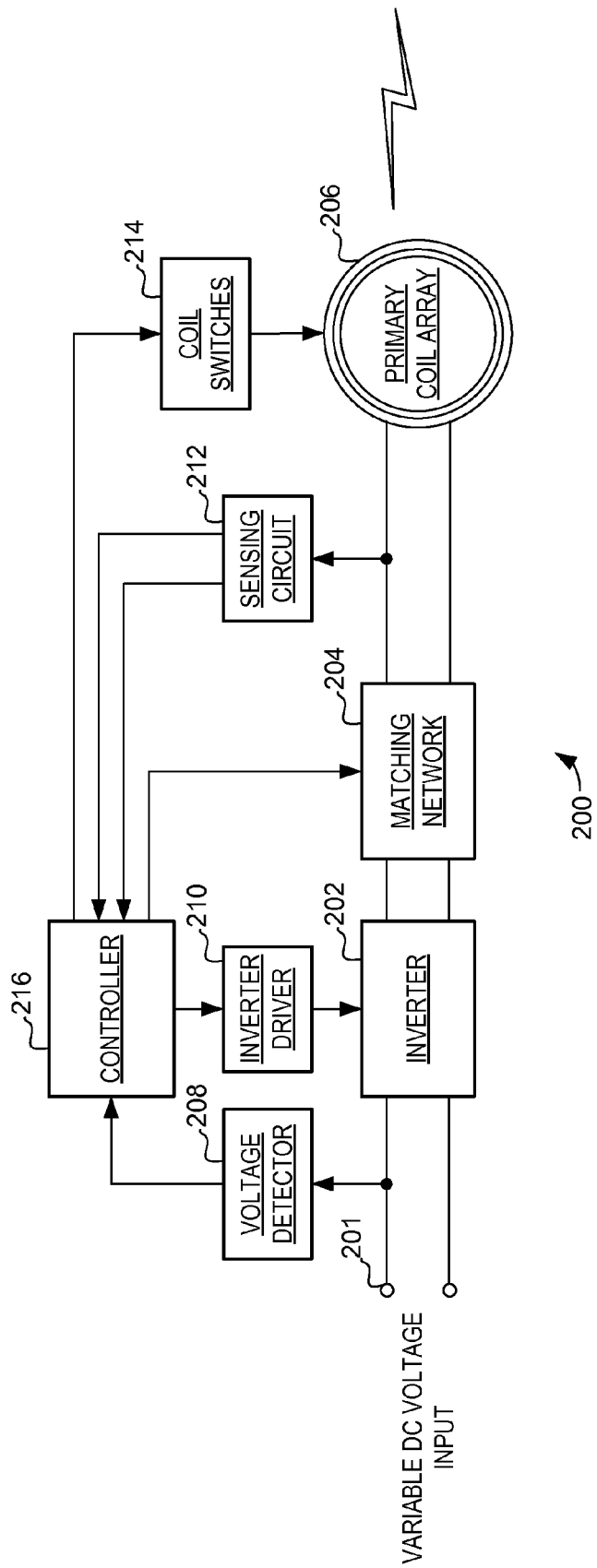
FIG. 2 is a detailed functional block diagram of a power transmitter in accordance with an example embodiment.

Turning now to FIG. 2, an exemplary embodiment of a power transmitter 200 for wireless charging of an electronic device is illustrated schematically. The power transmitter 200 includes a differential input 201, an inverter 202, a matching network 204, a primary coil array 206, a voltage detector 208, an inverter driver 210, a sensing circuit 212, coil switches 214, and a controller 216. In general, the power transmitter 200 is configured to receive a variable DC input voltage at the differential input 201 and wirelessly transmit power to a receiver coil of a nearby electronic device. In general, the inverter 202 is configured to receive a potentially wide range variable DC input voltage and generate an AC square-wave signal having a duty cycle selected to provide a predetermined equivalent voltage. The matching network 204 is configured to generate a charging signal from the AC square-wave signal and provide the charging signal to the primary coil array 206. In this illustrated embodiment the AC square wave and charging signal are passed as differential signals. The primary coil array 206 includes a plurality of selectable primary coils that are individually selectable such that a selected coil combination of one or more primary coils can be used to transmit a power transfer signal to a receiver coil of the electronic device.

The voltage detector 208 is configured to determine the magnitude of the variable DC input voltage and provide a signal indicating that magnitude to the controller 216. Based on the provided magnitude, the controller 216 controls the inverter driver 210 to control the operation of the inverter 202. Specifically, the controller 216 uses the magnitude and a sensed primary coil signal from sensing circuit 212 in determining a duty cycle for the AC square-wave signal by utilizing the phase shift technique. Based on the determined duty cycle, the controller 216 controls the inverter 202 (via inverter driver 210) to provide a desired equivalent voltage in the AC square-wave signal generated by the inverter 202. The controller 216 uses the inverter driver 210 to control the inverter 202 to generate this AC square-wave signal.

The coil switches 214 are coupled to the controller 216 and the primary coil array 206. The controller 216 selectively activates the coil switches 214 to control which primary coils in the array 206 are activated for use in transmitting power to the electronic device. These coil switches 214 can be activated to enable a coil combination of one or more primary coils in the array 206. Typically the coil combination used would correspond to those coils in the array 206 that have the best coupling with the corresponding receiver coil on the electronic device, and thus facilitate efficient power transfer to the electronic device. In an alternate embodiment, the primary coil array 206 may include only a single coil, rather than multiple coils, and the coil switches 214 may be excluded from the system.

The sensing circuit 212 is coupled to the plurality of selectable primary coils in the primary coil array 206. The sensing circuit 212 is configured to sense voltage/current levels on the on the primary coil array 206. This can be used to sense the current power transfer amount and signals transmitted from the electronic device and received by the primary coil array 206. Thus, the primary coil array 206 can be used to both transmit power to an electronic device for recharging, and can also be used to receive communications from the electronic device.

In one embodiment the communication from the electronic device may be implemented using a technique, referred to as load modulation, that includes changing the load of the receiver side for defined periods according to a specific standard protocol, such as a protocol defined in a Wireless Power Consortium wireless power transfer specification. In this implementation the load changes result in a modulation of the current through and/or voltage across the primary coil(s), which modulation can be sensed by the sensing circuit 212 and conveyed to the controller 216. The controller 216 can use the different timing periods between load changes to extract the communication message. In this case the communication message may be conveyed using a low frequency signal, as compared with the frequency of the power transfer signal.

Such a transmission of information to the power transmitter 200 can be utilized for a variety of purposes. For example, the electronic device can transmit information to the power transmitter 200, which indicates the amount of power that is being received by the electronic device. Such information can be used by the controller 216 to select the most efficient parameters for power transmission. As one example, such information can be used to identify a suitable receiver coil to receive the power. As another example, the information can be used to determine which of the plurality of selectable primary coils in the array 206 should be used to transmit power to the electronic device with maximum efficiency. As other examples, the information can be used to determine the fundamental frequency of the charging signal that results in the highest efficiency power transfer. As other examples, the information can be used to transmit a power amount required by receiver. As other examples, the information can be used to determine how long the power transfer will continue.

Figure 3:
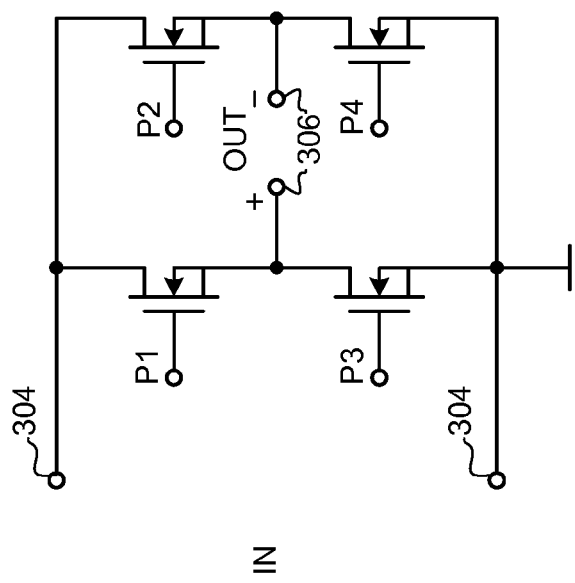
FIG. 3 is a schematic diagram of an H-bridge inverter in accordance with an example embodiment.

Turning now to FIG. 3, an embodiment of an inverter 302 is illustrated. Inverter 302 is exemplary of the type of inverter that can be used in the various embodiments described herein, including in the examples illustrated in FIGS. 1 and 2 (e.g., inverters 102, 202).

In general, the inverter 302 includes an input 304, an output 306, and four transistors P1, P2, P3 and P4. In the illustrated embodiment these transistors are implemented with power MOSFETS and are arranged in an H-bridge topology. Specifically, transistors P1 and P3 are arranged as a first complementary pair and transistors P2 and P4 are arranged as a second complementary pair. When transistors P1 and P4 are on (and transistors P2 and P3 are off), the output is driven positive, and when transistors P2 and P3 are on (and transistors P1 and P4 are off), the output is driven negative. Finally, when transistors P1 and P2 are on (and transistors P3 and P4 are off), or transistors P3 and P4 are on (and transistors P1 and P2 are off), the output is zero. Thus, by providing an appropriate DC input at input 304, and appropriately controlling the transistors P1, P2, P3 and P4 the inverter 302 and outputs an AC square-wave signal at output 306. Furthermore, by controlling the timing of the transistor activation (e.g., by controller 216 and inverter driver 210, FIG. 2) the duty cycle of the AC square-wave signal can be controlled.

Figure 4:
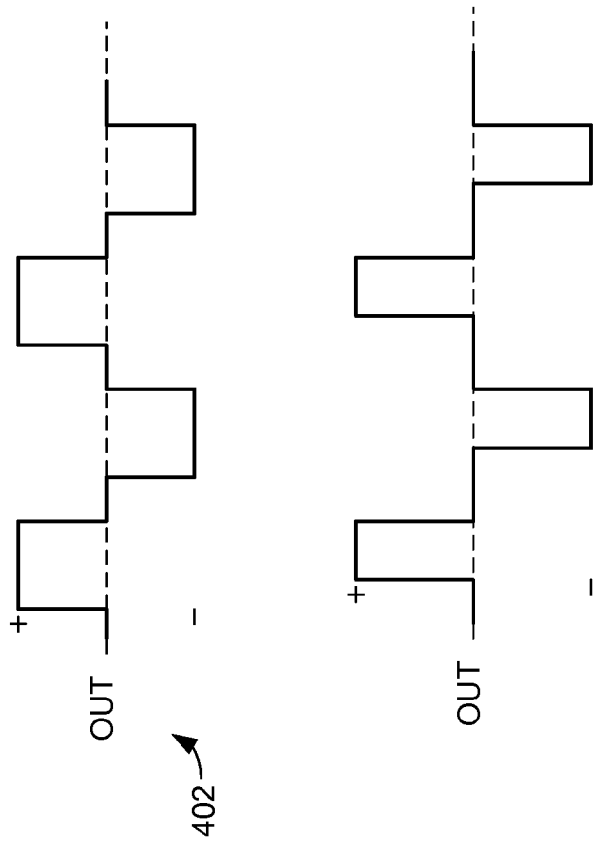
FIG. 4 are graphical diagrams of square wave signals having different duty cycles and magnitudes in accordance with an example embodiment.

Turning now to FIG. 4, two graphical representations of AC square-wave signals are illustrated. These AC square-wave signals are exemplary of the type of AC square-wave signals that can be generated by the inverter 302. The AC square-wave signals have a controllable duty cycle that results in a desired equivalent voltage output, effectively independent of the DC input voltage that is provided. The duty cycle of the AC square-wave signal is the ratio of the duration of the signal at active state(s) to the total period of a signal. In the examples of FIG. 4, these active states comprise both the high (+) and low (−) portions of the waveforms. Thus, graph 402 illustrates an example where the duty cycle of the AC square-wave signal is relatively high (i.e., a high ratio), while graph 404 illustrates an example where, by comparison, the duty cycle of the AC square-wave signal is relatively low (i.e., a low ratio). Graph 402 thus illustrates an example of the type of AC square-wave signal that would be generated when the DC input voltage was relatively low, while graph 404 illustrates an example of the type of AC square-wave signal that would be generated where the DC input voltage was relatively high. In both examples the difference in duty cycle can be used to generate the same desired equivalent voltage output in the AC square-wave signal, even though the DC input voltage used to generate those signals was different. Thus, controlling the duty cycles of the AC square-wave allows different DC input voltages to be used while providing the needed equivalent voltage at the output nodes for wireless charging.

Again, such AC square-wave signals as those illustrated in graphs 402 and 404 can be generated by switching transistors P1 and P4 on for the positive portions of the waveform (while switching transistors P2 and P3 off), switching transistors P2 and P3 on for the negative portions of the waveform (while switching P1 and P4 off), and switching either transistors P1 and P2 or transistors P3 and P4 on (and correspondingly switching transistors P3 and P4 or transistors P1 and P2 off) for the neutral portions of the waveform.

A variety of different techniques can be used to reduce power consumption in the inverter 302. In one embodiment the inverter 302 is configured to adjust the dead time of transistors to facilitate low switching loss. Specifically, the controller can operate the transistors in the inverter 302 to adjust the dead time of the transistors to assure quasi-resonant soft switching for low switching losses according to different input voltages and loads. Furthermore, the inverter 302 can be operated to use shifted phase topology. In general, a shifted phase topology is an implementation of 50% duty cycle control signal at each transistor pair of a full-bridge inverter by phase shifting the switching of one transistor pair (half-bridge) control signal with respect to the other. Such a phase shifted topology can facilitate constant frequency pulse-width modulation in conjunction with resonant zero-voltage switching to provide high efficiency at high frequencies.

Figure 5:
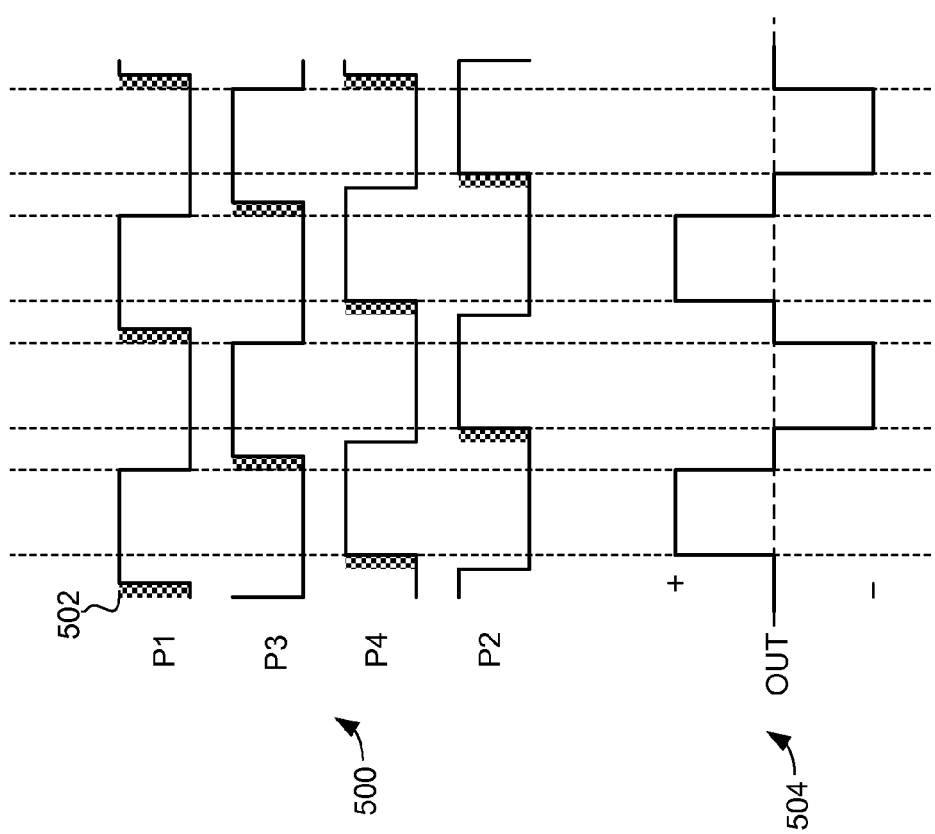
FIG. 5 is a graphical representation of a transistor switching technique in accordance with example embodiments.

Turning now to FIG. 5, a graphical representation 500 of a transistor switching technique and a graphical representation 504 of the resulting AC square-wave signals generated using an embodiment of a power transmitter (e.g., power transmitter 200, FIG. 2) are illustrated. This illustrated technique switches the transistors (e.g., of inverter 102, 202, 302, FIGS. 1-3) to generate a desired AC square-wave signal while potentially reducing power consumption through use of controlled "dead time" in each transistor pair (e.g., transistor pairs P1/P3 and P2/P4, FIG. 3). In general, the "dead time" of a transistor pair is the time interval between one transistor turning off and its complement transistor being turned on. Thus, instead of switching complementary pairs of transistors simultaneously, a slight difference or "dead time" between the two transistors' switching times is used to result in soft switching that can reduce power consumption in the inverter (e.g., inverter 302, FIG. 3). In FIG. 5 the dead times for the transistor pairs Pl/P3 and P2/P4 are illustrated with cross-hatched regions 502. Specifically, the cross-hatched regions 502 show dead times where one transistor in a transistor is pair is turned off and before the complement transistor in the transistor pair is off. As can be seen in the example of FIG. 5, the transistor pair P1 and P3 do not switch simultaneously due to the shift in switching times illustrated by cross-hatched regions 502. Likewise, the transistor pair P2 and P4 do not switch simultaneously due to the shift in switching times illustrated by cross-hatched regions 502. Again, the end result of generating proper dead times between switching can be a reduction in power consumption and increased overall efficiency. The graphical representation 504 illustrates the resulting real output AC square wave voltage from which dead time effect was taken in account.

Figure 6:
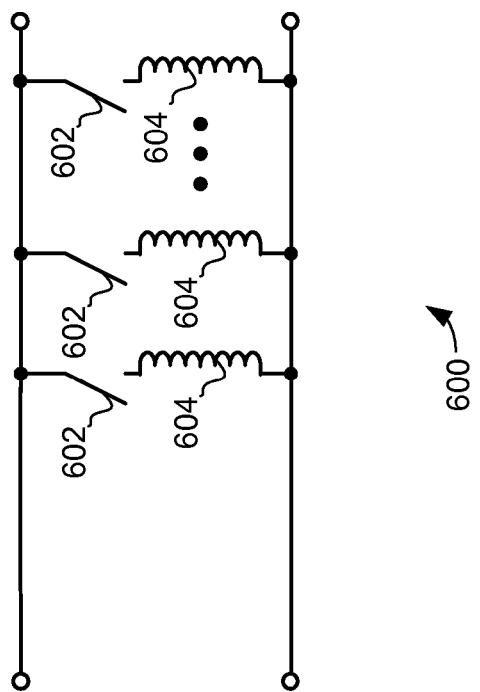
FIG. 6 is a schematic view of a primary coil array in accordance with an example embodiment.

Turning now to FIG. 6, an exemplary primary coil array 600 (e.g., primary coil array 106, 206, FIGS. 1, 2) is illustrated schematically. As described above, the primary coil array 600 includes a plurality of selectable primary coils 604. These primary coils 604 can be implemented with any mix of wire-wound coils, PCB coils, or hybrid/wire-wound coils. Switches 602 allow any combination of primary coils 604 to be selected into the circuit. This allows one or more primary coils 604 to be enabled and used to transmit a power transfer signal to a receiver coil (e.g., receiver coil 108, FIG. 1). In one specific embodiment each of the plurality of selectable primary coils 604 are selectively activated using switches 602 to enable a coil combination that is most effective to couple with a receiver coil. As will be described in greater detail below, the most effective coil combination can be enabled based on a feedback signal received from the electronic device, where the feedback signal provides an indication of power transfer efficiency.

Figure 7:
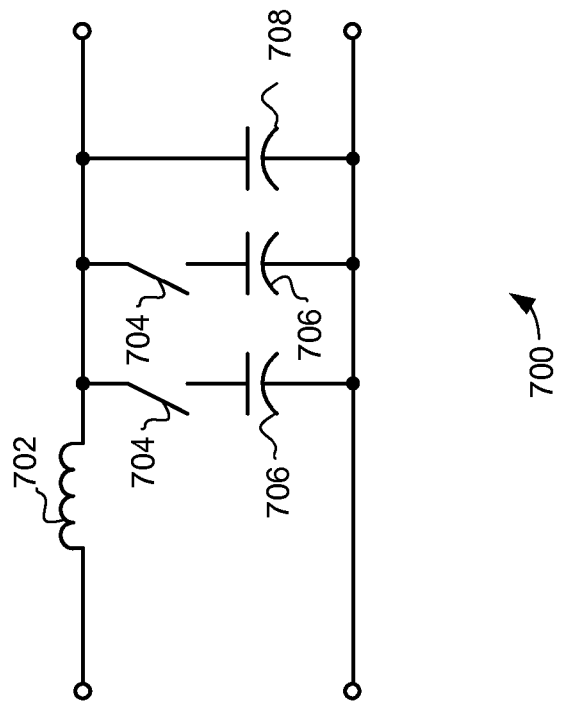
FIG. 7 is a schematic view of a matching network in accordance with an example embodiment.

Turning now to FIG. 7, an exemplary matching network 700 (e.g., matching network 104, 204, FIGS. 1, 2) is illustrated schematically. The matching network 700 includes an inductor 702, a plurality of switches 704, a plurality of switched capacitors 706 and an un-switched capacitor 708. In general, the action of the matching network 700 is to filter out high frequency harmonics from the AC square-wave and keep the fundamental frequency in form of a sinusoidal wave. Specifically, the matching network 700 is configured to generate a sinusoidal-wave charging signal from an AC square-wave signal and provide a substantially sinusoidal charging signal to the primary coil array (e.g., primary coil array 106, 206, FIGS. 1, 2). Furthermore in this embodiment the matching network 700 additionally may improve power transfer efficiency by facilitating selective switching of additional capacitors into the circuit.

As one example, if only one primary coil (e.g., coil 604) is determined to be needed in the selected coil combination to transmit power to the receiver coil then the un-switched capacitor 708 may be sufficient to provide a resonant frequency of the overall circuit that closely matches the fundamental frequency of the power transfer signal and thus facilitates efficient power transfer. However, if two primary coils (e.g., two of coils 604) are to be used in the coil combination (e.g., as could occur if the receiver coil is spatially placed between two primary coils) then an additional capacitor 706 can be switched into the circuit to again provide the proper resonant frequency and thus efficient power transfer. In the case of a third coil being used in the coil combination a third capacitor 706 can likewise be switched into the circuit to make the correct resonant frequency. Thus, in each case the switched capacitors 706 may be selected to compensate for additional primary coils in the selected coil combination to make the resonant frequency of the power transmitter near the fundamental frequency.

Figure 8:
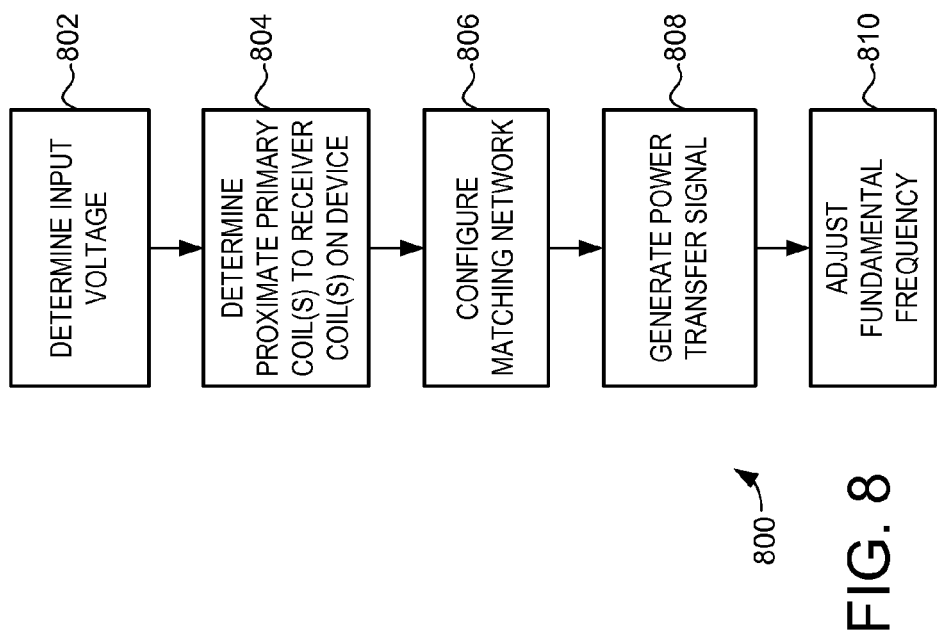

Turning now to FIG. 8, a method 800 of wirelessly transferring power to an electronic device is illustrated. In general, the method 800 facilitates wireless power transfer using a wide range of DC input voltages, and thus may provide improved flexibility for wireless power transfer to electronic devices. Furthermore, the method 800 may facilitate efficient wireless power transfer.

Step 802 may include determining an input voltage (e.g., by voltage detector 208, FIG. 2). This determining of the input voltage can be performed using any suitable technique or device. As described above, in the various embodiments the input voltage can comprise a wide range of DC input voltages, such as between about 5 and about 20 volts, or some other range. This may facilitate flexibility in using different sources to provide power for wireless power transfer. For example, the method can be used with Universal Serial Bus (USB) based power sources that are approximately 5 volts, or automotive power sources that are commonly between 9 and 14 volts. As will be described in greater detail below, the determined input voltage will be used in generating an AC square-wave signal that has a predetermined equivalent voltage, and dead time adjustment for quasi-resonance soft switching operation as well.

In some embodiments the determination of the input voltage may be performed every time a power source is provided to the charger—for example, every time a wireless charger is plugged into a new power source. In other cases the input voltage may be continuously, periodically, or occasionally determined to allow for adjustments in response to dynamic changes in input voltage. For example, the embodiments can facilitate adjustment in response to an automotive power system being changing from being supplied by an alternator (typically at 14 volts) to a battery (typically at 12 volts).

Step 804 includes determining proximate primary coil(s) (e.g., coils of primary coil array 106, 206, 600, FIGS. 1, 2, 6) to a receiver coil (e.g., receiver coil 108, FIG. 1) on the electronic device. In general this step determines when an electronic device has been placed close to the primary coils for charging, and also determines which primary coils have the best coupling to the receiver coil, and thus should be used for charging. In one embodiment this step can be initiated by transmitting a "ping" signal from one or more primary coils and having the electronic device respond to a received "ping" signal with an appropriate acknowledgment signal. This acknowledgement signal can be transmitted by the receiver coil and received back by the primary coil, and then delivered to a controller (e.g., controller 216, FIG. 2) using a device such as the sensing circuit 212 (FIG. 2) discussed above.

Specifically, when it has been determined that an electronic device to be charged is nearby, step 804 determines which primary coils are proximate to the receiver coil and thus have good coupling with the receiver coil. This determination allows those primary coils with the best coupling to be activated and thus facilitates high power transfer efficiency. In some cases more than one primary coil is sufficiently close and should be activated. This may occur when the receiver coil is between two or more primary coils. In other cases only one primary coil should be activated. In either case a primary coil combination of one or more primary coils should be selected to provide efficient transfer to the receiver coil.

In one embodiment step 804 includes sequentially transmitting from each primary coil individually, transmitting from combinations of two primary coils, and transmitting from combinations of three primary coils. With each transmitting the receiving electronic device can determine how much power is being transferred and communicate that information back to the wireless power transmitter. When all the combinations of primary coils have been tried the wireless power transmitter can determine which primary coil combination resulted in the most efficient power transfer. Thus, each of the plurality of selectable primary coils may be selectively activated to determine which coil combination couples with the receiver coil on the electronic device most effectively, and that determination is based on a feedback signal received from the electronic device.

Step 806 includes configuring the matching network (e.g., matching network 104, 204, 700, FIGS. 1, 2, 7). In general the matching network is utilized to generate a sinusoidal-type charging signal from an AC square-wave signal. The charging signal is then provided to the primary coil array (e.g., primary coil array 106, 206, FIGS. 1, 2) for transmitting to the electronic device. In step 806 the matching network is configured to improve power transfer efficiency. Specifically, the matching network is configured to provide a resonant frequency of the overall circuit that closely matches the fundamental frequency of the power transfer signal and thus facilities efficient power transfer. This can be done by configuring the matching network to compensate for the use of additional primary coils in the utilized coil combination. For example, if two primary coils (e.g., two of coils 604, FIG. 6) are to be used instead of one then an additional capacitor (e.g., one of switched capacitors 706, FIG. 7) can be switched into the circuit to provide the proper resonant frequency and efficient power transfer. Likewise, in the case of a third coil being used another additional capacitor can likewise be used to produce a signal having the correct resonant frequency. In each case the added capacitors are switched into the circuit to configure the matching network to make the resonant frequency of the power transmitter near the fundamental frequency of the charging signal.

Step 808 includes generating a power transfer signal. In general generating the power transfer signal comprises inverting (e.g., by inverter 102, 202, 302, FIGS. 1-3) a DC input voltage to generate an AC square-wave signal, generating (e.g., by matching network 104, 204, 700, FIGS. 1, 2, 7) a sinusoidal-type charging signal from the AC square wave-signal, and applying the charging signal to one or more primary coils (e.g., of primary coil arrays 106, 206, 600, FIGS. 1, 2, 6) to wirelessly transmit power to a receiver coil (e.g., receiver coil 108, FIG. 1). A detailed discussion of this step will be provided below with reference to FIG. 9.

Step 810 includes adjusting the fundamental frequency of the signal to increase efficiency of the power transfer. In general this can be performed by generating the AC square-wave signal at a plurality of different frequencies, measuring the resulting power transfer to the electronic device, and determining which of those frequencies results in efficient power transfer. For example, in one embodiment an inverter (e.g., inverter 102, 202, 302, FIGS. 1-3) can be controlled to generate the AC square-wave signals at 1 MHz increments over a predetermined range of frequencies. These result in charging signals and resulting power transfer signals being generated at these different frequencies. The electronic device can receive these different power transfer signals using its receiver coil. By measuring the resulting power transfer at the each frequency point the electronic device can use a load modulation method to send a feedback signal (indicating the power transfer efficiency) from the receiver coil to the power transmitter primary coils. As described above, such transmitting results in signals on the primary coil that can be measured and used to extract the data. From this extracted data the power transmitter can select the most efficient frequency for power transfer.

Such a technique can be used to compensate for variations in the circuit that affect the various resonant frequencies. Stated another way, stepping through the frequencies allows the precise resonant frequency that results in efficient power transfer to be determined in a way that can compensate for the effects of the primary coil combination selection and matching network configuration. Again, implementation of such a technique may result in improved power transfer efficiency.

Figure 9:
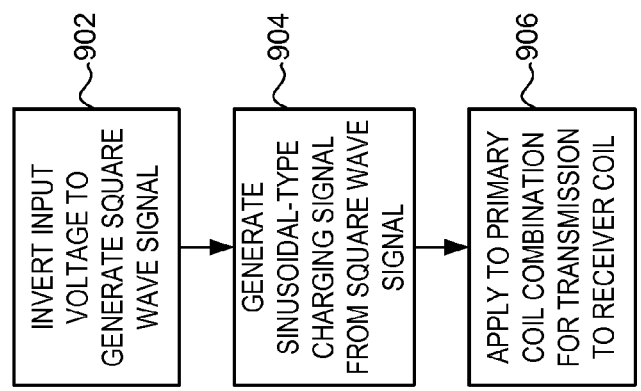
FIGS. 8-9 are method diagrams illustrating methods for wireless power transfer in accordance with an example embodiment.

Turning now to FIG. 9, a method 900 for generating a power transfer signal is illustrated. The method 900 details the steps involved in generating a power transfer signal, such as for step 808 in FIG. 8. Such steps may be continuously, periodically, or occasionally performed as power is transferred to a receiver coil (e.g., receiver coil 108, FIG. 1) of an electronic device.

Step 902 includes inverting an input voltage to generate a square-wave signal. As described above, controllably inverting the input voltage to generate a square-wave signal allows the duty cycle of the square-wave signal to be selected to have a predetermined equivalent voltage. This allows a wide range of input voltages to be used while still providing a desired equivalent voltage for the square-wave signal.

As one example an H-bridge topology single stage inverter is used (e.g., inverter 302, FIG. 3). Such an inverter allows for the duty cycle of an AC square-wave signal to be modulated by controlling the timing of the transistor activation. Specifically, when the magnitude of the input voltage is relatively low the duty cycle of the square-wave signal can be made relatively high to generate the desired equivalent voltage. Conversely, when the magnitude of the input voltage is relatively high the duty cycle of the square-wave signal can be made relatively low to generate the same desired equivalent voltage. Thus, a wide range of input voltages can be used to generate the needed equivalent voltage output for wireless charging.

Furthermore, such an inverter can provide reduced power consumption. For example, the inverter can provide reduced power consumption by adjusting the dead time of transistors to facilitate low switching loss according to input voltage and loading.

Step 904 includes generating a sinusoidal-type charging signal from the AC square-wave signal. In general, by passing the AC square-wave signal through an appropriate matching network a sinusoidal-type charging signal can be generated. Furthermore, the matching network can be configured to improve power transfer efficiency by providing a mechanism to adjust the resonant frequency of the overall circuit such that it closely matches the fundamental frequency of the charging signal. Again, this can be done by configuring the matching network to compensate for the use of additional primary coils in the utilized coil combination.

Step 906 includes applying the charging signal to a selected coil combination of one or more primary coils to wirelessly transmit power to a receiver coil of the device to be charged. As described above, a primary coil array that includes a plurality of selectable primary coils can be used. These primary coils can be implemented with any combination of wire-wound coils, PCB coils, or hybrid/wire-wound coils. These primary coils are individually selectable such that a coil combination of one or more primary coils in the array can be selected. When the charging signal is applied to the selected coil combination a power transfer signal is transmitted to a nearby receiver coil. Because the coil combination can be selected to provide good coupling with a receiver coil (see step 804 of FIG. 8) such a transfer can be done with relatively high efficiency.

Thus, the embodiments described herein provide a power transmitter for wireless charging of an electronic device. In general, the power transmitter uses an inverter configured to generate a square-wave from a potentially wide ranging DC input voltage. The inverter is configured to generate the square-wave with a duty cycle that results in a desired equivalent voltage output, effectively independent of the DC input voltage that is provided. Thus, by generating a square-wave with a selectable duty cycle the inverter provides the ability to facilitate wireless power transfer with a wide range of DC input voltages, and thus provides improved flexibility for wireless power transfer to electronic devices. Furthermore, in some embodiments the power transmitter provides improved power transfer efficiency using a matching network that is dynamically selectable to more effectively couple with the transmitter coil combination being used to transmit power to the electronic device. Furthermore, in some embodiments the fundamental frequency of the power transfer signal is controllable to provide improved power transfer efficiency. Furthermore, in some embodiments the dead time of the transistors of the inverter is adjustable to reduce power consumption and may result in improved power transfer efficiency.

The connecting lines shown in the various figures contained herein are intended to represent exemplary functional relationships and/or physical couplings between the various elements. It should be noted that many alternative or additional functional relationships or physical connections may be present in an embodiment of the subject matter. In addition, certain terminology may also be used herein for the purpose of reference only, and thus are not intended to be limiting, and the terms "first", "second" and other such numerical terms referring to structures do not imply a sequence or order unless clearly indicated by the context.

As used herein, a "node" means any internal or external reference point, connection point, junction, signal line, conductive element, or the like, at which a given signal, logic level, voltage, data pattern, current, or quantity is present. Furthermore, two or more nodes may be realized by one physical element (and two or more signals can be multiplexed, modulated, or otherwise distinguished even though received or output at a common node).

The foregoing description refers to elements or nodes or features being "connected" or "coupled" together. As used herein, unless expressly stated otherwise, "connected" means that one element is directly joined to (or directly communicates with) another element, and not necessarily mechanically. Likewise, unless expressly stated otherwise, "coupled" means that one element is directly or indirectly joined to (or directly or indirectly communicates with, electrically or otherwise) another element, and not necessarily mechanically. Thus, although the schematics shown in the figures depict one exemplary arrangement of elements, additional intervening elements, devices, features, or components may be present in an embodiment of the depicted subject matter.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A power transmitter for wirelessly charging an electronic device, the power transmitter comprising:
    an input configured to receive a DC input voltage;
    an inverter coupled to the input to receive the DC input voltage, the inverter configured to generate an AC square-wave signal having a duty cycle selected to provide a predetermined equivalent voltage;
    a matching network coupled to the inverter to receive the AC square-wave signal, the matching network configured to generate a charging signal from the AC square-wave signal, the matching network including a plurality of switched capacitors;
    a plurality of primary coils coupled to the matching network to receive the charging signal, the plurality of primary coils configured to be selectable in multiple different coil combinations, each of the multiple different coil combinations including a number of the plurality of primary coils, with at least one of the multiple different coil combinations including more than one of the plurality of primary coils to facilitate transmission with different numbers of primary coils, the plurality of primary coils configured to selectively transmit a power transfer signal to a receiver coil on the electronic device; and
    wherein the plurality of switched capacitors are selectively switched based on the number of the plurality of primary coils in a selected coil combination used to transmit the power transfer signal such that the matching network resonates with the selected coil combination at a resonant frequency that closely matches a fundamental frequency of the charging signal.

2. The power transmitter of claim 1 wherein the inverter comprises a single-stage H-bridge topology.

3. The power transmitter of claim 1 wherein the inverter is configured to generate the AC square-wave signal with the duty cycle selected using a phase shifted topology.

4. The power transmitter of claim 1 wherein the inverter includes power transistor pairs, and wherein the inverter is configured to adjust dead times of the transistors based on a magnitude the DC input voltage.

5. The power transmitter of claim 1 wherein the inverter is configured to generate the AC square-wave signal at a plurality of different frequencies, and wherein the power transmitter is further configured to determine which of the plurality of different frequencies results in efficient power transfer to the electronic device.

6. The power transmitter of claim 5 wherein the power transmitter is configured to determine which of the plurality of different frequencies results in efficient power transfer to the electronic device based on feedback received from the electronic device.

7. The power transmitter of claim 1 wherein the matching network further includes an inductor.

8. The power transmitter of claim 1 wherein the selected coil combination is determined by selectively activing each of the plurality of primary coils to determine a coil combination that most effectively couples with the receiver coil on the electronic device.

9. The power transmitter of claim 8 wherein the coil combination is determined based on a feedback signal received from the electronic device.

10. The power transmitter of claim 1 further comprising an input voltage detector configured to determine a magnitude of the DC input voltage.

11. The power transmitter of claim 10 wherein the inverter is configured to select the duty cycle by utilizing a phase shifted technique to provide the predetermined equivalent voltage based on the determined magnitude of the DC input voltage.

12. The power transmitter of claim 1 further comprising a sensing circuit coupled to the plurality of primary coils, and wherein the sensing circuit is configured to sense a signal received on at least one of the plurality of primary coils to facilitate communication from the electronic device and control a power transfer amount to the electronic device.

13. The power transmitter of claim 1 further comprising a microcontroller, the microcontroller configured to control operation of the inverter, the matching network and the plurality of primary coils.

14. A power transmitter for wirelessly charging an electronic device, the power transmitter comprising:
    an input configured to receive a DC input voltage that can vary in a range from about 5 to about 20 volts;
    an input voltage detector coupled to the input and configured to determine a magnitude of the DC input voltage;
    a single-stage bridge inverter coupled to the input to receive the DC input voltage and to generate an AC square-wave signal;
    a matching network comprising a plurality of switched capacitors and a matching inductor, the matching network coupled to the inverter to receive the AC square-wave signal and configured to generate a sinusoidal-type charging signal from the AC square-wave signal, where the sinusoidal-type charging signal has a fundamental frequency;
    a plurality of selectable primary coils coupled to the matching network to receive the sinusoidal-type charging signal and configured to selectively transmit a power transfer signal to a receiver coil of the electronic device; and
    a microcontroller coupled to the input voltage detector, the inverter, the matching network, and the plurality of selectable primary coils, the microcontroller configured to:
        control the inverter to generate the AC square-wave signal with a duty cycle selected based on the determined magnitude of the DC input voltage such that the AC square-wave signal provides a predetermined equivalent voltage;
        control the plurality of selectable primary coils to selectively activate a coil combination that most effectively couples with the receiver coil of the electronic device, where the coil combination can include more than one of the plurality of selectable primary coils to facilitate transmission with different numbers of the selectable primary coils; and
        selectively couple the plurality of switched capacitors in the matching network based on a number of the plurality of selectable primary coils in the activated coil combination such that the matching network resonates with the activated coil combination at a resonant frequency that closely matches the fundamental frequency of the sinusoidal-type charging signal.

15. A method of wirelessly charging an electronic device, the method comprising:
  receiving a DC input voltage;
  controllably inverting the DC input voltage to generate an AC square-wave signal having a duty cycle selected to provide a predetermined equivalent voltage;
  generating a charging signal from the AC square-wave signal;
  selecting a coil combination from multiple different coil combinations, each of the multiple different coil combinations including a number of a plurality of primary coils with at least one of the multiple different coil combinations including more than one of the plurality of primary coils to facilitate transmission with different numbers of primary coils;
  selectively switching capacitors in a plurality of switched capacitors based on the number of the plurality of primary coils in the selected coil combination to resonate the selected coil combination at a resonant frequency that closely matches a fundamental frequency of the charging signal; and
  driving the selected coil combination using the charging signal to transmit a power transfer signal to a receiver coil of the electronic device.

16. The method of claim 15 wherein the controllably inverting the DC input voltage to generate the AC square-wave signal comprises using a shifted phase topology.

17. The method of claim 15 wherein the controllably inverting the DC input voltage to generate the AC square-wave signal comprises adjusting dead times of a plurality of transistor pairs based on a magnitude of the DC input voltage.

18. The method of claim 15 further comprising generating the AC square-wave signal at a plurality of different frequencies, and determining which of the plurality of different frequencies results in efficient power transfer to the electronic device.

19. The method of claim 18 wherein the determining which of the plurality of different frequencies results in efficient power transfer to the electronic device is based on feedback received from the electronic device.

20. The method of claim 15 further comprising determining a magnitude of the DC input voltage and wherein the duty cycle is further selected based on the magnitude of the DC input voltage.

* * * * *